United States Patent
Demes et al.

(10) Patent No.: US 7,101,821 B2
(45) Date of Patent: Sep. 5, 2006

(54) SILICON COMPOSITION

(75) Inventors: Hagen Demes, Obertshausen (DE); Helmut Fackler, Lauingen (DE)

(73) Assignee: Dow Corning Corporation, Auburn, MI (US)

( * ) Notice: Subject to any disclaimer, the term of this patent is extended or adjusted under 35 U.S.C. 154(b) by 55 days.

(21) Appl. No.: 10/515,785

(22) PCT Filed: May 27, 2003

(86) PCT No.: PCT/EP03/06268

§ 371 (c)(1),
(2), (4) Date: Nov. 24, 2004

(87) PCT Pub. No.: WO03/099828

PCT Pub. Date: Dec. 4, 2003

(65) Prior Publication Data

US 2005/0176864 A1    Aug. 11, 2005

(30) Foreign Application Priority Data

May 29, 2002 (GB) .................................. 02123248

(51) Int. Cl.
*C04B 35/00* (2006.01)
*C04B 33/00* (2006.01)
*C04B 35/622* (2006.01)

(52) U.S. Cl. ................ 501/155; 501/94; 501/128; 501/130; 501/131; 501/141; 501/146; 501/154; 106/287.1; 106/287.14

(58) Field of Classification Search ............. 106/287.1, 106/287.14; 501/94, 128, 130, 131, 141, 501/146, 154, 155
See application file for complete search history.

(56) References Cited

U.S. PATENT DOCUMENTS

| 2,380,995 | A |   | 8/1945  | Rochow          |         |
|-----------|---|---|---------|-----------------|---------|
| 4,226,635 | A |   | 10/1980 | Kindrick et al. |         |
| 4,408,030 | A |   | 10/1983 | Marko           |         |
| 4,646,661 | A |   | 3/1987  | Roos et al.     |         |
| 4,690,810 | A |   | 9/1987  | Breneman et al. |         |
| 5,126,203 | A |   | 6/1992  | Ritzer et al.   |         |
| 5,350,549 | A |   | 9/1994  | Boyle           |         |
| 5,876,609 | A |   | 3/1999  | White et al.    |         |
| 6,905,996 | B1 | * | 6/2005 | Fackler et al.  | 501/155 |

FOREIGN PATENT DOCUMENTS

| DE | 3713482     | 11/1988 |
| DE | 4333235     | 4/1995  |
| DE | 199929568   | 9/2000  |
| EP | 0314971     | 10/1988 |
| EP | 0428337     | 11/1990 |
| EP | 0603691     | 6/1994  |
| EP | 0867442     | 9/1998  |
| RU | 2118561     | 9/1998  |
| WO | WO 02/46119 | 12/2001 |
| WO | WO 02/46118 | 6/2002  |

OTHER PUBLICATIONS

English language Abstract for DE 37 13 482 A1 extracted from espacenet.com database dated Mar. 16, 2005.
English language Abstract for DE 43 33 235 A1 extracted from espacenet.com database dated Mar. 16, 2005.
English language Abstract for DE 199 29 568 A1 extracted from espacenet.com database dated Mar. 16, 2005.
English language Abstract for EP 0 603 691 B1 extracted from espacenet.com database dated Mar. 16, 2005.
English language Abstract for RU 2 118 561 C1 extracted from espacenet.com database dated Mar. 16, 2005.
"Espindeas Direct Process For Obtaining Concentrated And Weak Nitric Acid", Nitrogen Journal, vol. 184 (Mar.-Apr. 1990)pp. 1-2.

* cited by examiner

*Primary Examiner*—David Brunsman
(74) *Attorney, Agent, or Firm*—Howard & Howard

(57) ABSTRACT

This invention provides a silicon composition comprising at least 15 wt % of hydrolysed silicon compounds and at least 3 wt % of a binder material. The silicon composition is used in the manufacture of ceramics. The hydrolysed silicon compounds can for example be the gel produced by hydrolysing higher boiling point organohalosilanes produced in the manufacture of organohalosilanes or halosilanes by the direct process.

29 Claims, No Drawings

SILICON COMPOSITION

TECHNICAL FIELD

This application is a national stage entry under section 371 of PCT/EP03/06268, filed 27 May 2003.

The present invention relates to a silicon composition containing hydrolysed silicon compounds, and to its use in the manufacture of ceramics.

BACKGROUND AND PRIOR ART

Organohalosilanes, alkoxysilanes, halosilanes, and in particular methylchlorosilanes, are the building blocks from which silicone polymers are produced. Organohalosilanes and halosilanes are commercially produced by what is commonly called "the direct process", in which silicon metal is reacted with an organic halide or hydrogen chloride, optionally in the presence of a catalyst. The direct process is well known in the art, and is described for example in U.S. Pat. No. 2,380,995. For example, in the commercial production of methylchlorosilanes by the direct process, finely ground silicon metal powder is reacted with methyl chloride in the presence of a catalyst by fluidising the silicon powder in a fluid bed by passing methyl chloride gas there through at a temperature of between 200° C. and 500° C.

As well as methylchloromonosilanes and/or chloromonosilanes, the direct process and other processes for the production of organic silicon compounds or silicon halides from silicon metal produce higher boiling point silicon compounds, particularly higher boiling point halosilanes, which are chemically active materials. Once separated from the other reaction products of the direct process, these higher boiling point silicon compounds can be hydrolysed to obtain a gel-solids mixture, referred to hereinafter as "Silicone gel", which is a mixture of hydrolysed silicon compounds. Methods of producing such a solid or granular Silicone gel are described for example in U.S. Pat. No. 4,408,030, U.S. Pat. No. 4,690,810 and U.S. Pat. No. 5,876,609.

The present inventors have now found a useful way of processing Silicone gel or other hydrolysed silicon compounds into ceramic articles which demonstrate improved physical and/or physicochemical properties.

SUMMARY OF THE INVENTION

According to a first aspect of the invention there is provided a silicon composition comprising 25 to 95 wt % of a silicone gel, the major components of which are hydrolysed disilanes, and 3 to 75 wt % of a binder material.

According to a second aspect of the invention there is provided a silicon composition comprising 15 to 80 wt. % of hydrolysed silicon compounds, 3 to 75 wt % of a binder material and 10 to 70 wt. % of a solid reagent which is reactive with the hydrolysed silicon compounds but does not act as a binder.

The invention also includes a method for making a ceramic article which method comprises shaping such a silicon composition to form a pre-ceramic article and baking the article at an elevated temperature, and also includes ceramic articles produced thereby.

The invention also includes the use of hydrolysed silicon compounds as an additive in a pre-ceramic composition comprising clay and alumina which is fired to form a ceramic article capable of retaining its shape at a temperature of 1450° C.

DETAILED DESCRIPTION OF THE INVENTION

As used herein, "clay" is given its dictionary definition, i.e. it refers to various forms of hydrated alumino silicate, e.g. those hydrated alumino silicates of general formula $nAl_2O_3mSiO_2.xH_2O$, where x is the degree of hydration.

As used herein, "ceramic" is given its usual definition, i.e. a hard, brittle product manufactured by the action of heat (called firing or baling) on materials such as earthy raw materials and/or metal oxides.

The hydrolysed silicon compounds are preferably the hydrolysed product of higher boiling point organohalosilanes produced in the manufacture of organosilicon materials or halosilanes, for example the Silicone gel produced by hydrolysing the higher boiling point silicon compounds in the product of the direct process. A typical procedure for producing the Silicone gel consists of neutralising (hydrolysing) the higher boiling point silicon compounds with a base, for example with lime solution, to reduce their reactivity, and dewatering, resulting in the gel-solids mixture. The precise composition of the Silicone gel thus produced may vary; typically the major components of Silicone gel are hydrolysed disilanes, that is the amount of disilanes in the Silicone gel is more than 50 wt %, for example from 60 to 80 wt %. The Silicone gel may also contain silmethylenes, that is to say compounds containing a >Si—$CH_2$—Si< moiety. The remainder of the Silicone gel comprises a variety of materials, typically including iron, silicon metal, copper, organic materials, and salts (e.g. calcium chloride).

The Silicone gel can be used in the form in which it is produced or can be modified, for example by the separation of ungelled solids and/or by removal of salts. The higher boiling point silicon compounds can be filtered before they are hydrolysed; this removes ungelled solid materials such as silicon metal, iron and copper derived from the direct process reaction vessel. The Silicone gel can be washed after it is formed to remove at least partly soluble salts such as calcium chloride. The washing step can be combined with a further separation step to remove a heavy mineral phase; for example the washing step can be carried out in a centrifuge. The hydrolysed silicon compounds which are in gelled form are generally the most effective in imparting improved physical and physico-chemical properties to ceramics, A modified gel from which ungelled solids and salts have been separated can generally be used at a lower level than an unmodified gel/solids mixture to achieve the same heat resistance in ceramics, and can form ceramics of better physical properties.

Higher boiling point silicon compounds including disilanes are also produced in other processes, for example the process called Direct TMS for the manufacture of trimethoxysilane and tetramethoxysilane from silicon and methanol in the presence of copper. The higher boiling point silicon compound stream from such a process can be hydrolysed, preferably with dewatering as described above, to produce hydrolysed silicon compounds suitable for use in the present invention.

Unless specified otherwise herein, all wt % of components are percentages by weight of the total weight of the silicon composition (before firing) or the ceramic composition as the case may be. The wt % of a component refers to the dry weight of that component unless specified otherwise. The wt % given for the Silicone gel and other hydrolysed silicon compounds in the silicon composition before firing is the percentage weight of the hydrated Silicone gel material, which typically contains from about 40 to 50 wt. % water.

The level of the hydrolysed silicon compounds (for example Silicone gel) in the silicon compositions can vary from about 15 wt %, preferably from 25 wt %, up to about 95, preferably up to 80 wt %. For example, the hydrolysed silicon compounds can be present at a level of at least 40 or 50 wt % of the silicon composition.

The binder material is generally a material which improves the cohesion of the constituents of the silicon composition. Preferably, the binder material is reactive with the hydrolysed silicon compounds. Materials capable of neutralising halosilanes are generally reactive with Silicone gel to some extent. Suitable binder materials include clays and metal hydroxides, for example aluminium hydroxide or magnesium hydroxide.

The level of binder material present in the silicon composition can vary from about 3 to about 75 wt % depending on amongst other things the particular binder material being used and the properties desired in the ceramic articles to be made from the silicon compositions. Preferably the silicon composition contains at least 5 wt %, preferably at least 10 wt % of binder material.

A particularly useful binder material is clay. Suitably clay may be present in the silicon compositions at from 3 to 75 wt %, preferably from 3 to 30 wt %, more preferably from 5 to 25 wt % and yet more preferably from 5 to 20 wt %.

Examples of commonly known clays suitable for use as the binder in the present invention include fuller's earth, bentonite, kaolin (China clay), montmorillonite and diatomite. Alumina rich clays are preferred. These clays are generally reactive with the hydrolysed silicon compounds.

When clay is present as the binder material, the weight ratio of wet Silicone gel or similar hydrolysed silicon compounds to dry clay in the silicon compositions suitably ranges from 30:1 to 1:2, preferably from 20:1 to 1:2, more preferably from 10:1 to 2:1.

The silicon composition can additionally contain a solid reagent which is reactive with the hydrolysed silicon compounds but does not act as a binder. The presence of such a solid reagent is strongly preferred when the binder material is not reactive with the hydrolysed silicon compounds, and is preferred in many cases even when the binder material is reactive with the hydrolysed silicon compounds. Examples of such solid reagents are metal oxides. The preferred metal oxide is alumina ($Al_2O_3$); zirconium oxide, titanium oxide or magnesium oxide are alternatives. Alternative solid reagents are metal salts such as zirconium carbonate, zirconium nitrate or magnesium carbonate.

The solid reagent which is reactive with the hydrolysed silicon compounds but does not act as a binder is preferably present in the silicon composition at least 10 wt %, particularly 10–70 wt %. Alumina may for example be present in the silicon compositions at from about 20 to about 70 wt %, preferably from 30 to 50 wt %.

The silicon composition may for example comprise at least 25, particularly 25 to 70, wt. % hydrolysed silicon compounds, at least 10, particularly 10 to 55, wt % binder material and at least 20, particularly 20 to 65, wt. % of the solid reagent which is reactive with the hydrolysed silicon compounds but does not act as a binder.

Other additional components may also be present. In particular, components useful in the conversion of the silicon compositions into useful ceramics or which impart useful characteristics on the ceramics formed there from may be present. Useful additional components include the following:

(i) Pressing aids which help, for example, in the extrusion of the silicon compositions, reducing the pressure required. Useful pressing aids include lubricating solid materials, for example, graphite, fatty acids or aluminium stearate. Pressing aids are suitably present in the silicon compositions in an amount of from 0.01 to 0.5 wt %.

(ii) "Opening" agents which aid the drying of the ceramic articles made from the silicon compositions. Solid reagents such as alumina generally have this property, but the silicon composition can alternatively or additionally contain a non-reactive opening agent. Useful opening agents include, for example, silica, such as fumed silica or precipitated silica, and quartz. Such opening agents are suitably present in the silicon compositions in an amount of from 1 to 10 wt %, preferably in an amount of from 1 to 6 wt %. For example silica has been found to be a useful opening agent at a level of from 4 to 5 wt %.

(iii) "Volumisers", that is fillers which increase the porous volume and lower the density of the ceramic articles made from the silicon compositions. Useful volumisers include saw dust, polystyrene, pvc, perlite and polyurethane. The volumiser can for example be used at 0.5 to 15% by weight of the silicon composition depending on its density (lower density fillers needed at lower wt. %).

(iv) "Sintering agents" which are useful in the manufacture of bricks to lower the eutectic temperature of the composition and thus lower the firing temperature. Useful sintering agents include boric acid, sodium borate and calcium carbonate, which may suitably be present in an amount of up to 1.0 wt %, preferably up to 0.5 wt % of the silicon composition.

In the preparation of a silicon composition according to the invention, the binder material is added to the hydrolysed silicon compounds and the mixture is mixed, preferably with mechanical working such as grinding or milling, to form the silicon composition. The hydrolysed silicon compounds may be pretreated to convert them to a more suitable form for mixing. For example, Silicone gel is preferably ground in a first step until it takes on a paste-like consistency. The binder material is preferably added as a powder (dry or hydrated) but can alternatively be added as a paste or slurry. Other components such as the solid reagent may be incorporated prior to, simultaneously with or after the addition of the binder material. The mixture is mixed using any suitable mixing equipment such as, for example, a pan mill, a pug mill or a finger mill, until the silicon composition is substantially homogeneous. The silicon composition can then be shaped, for example either pressed into moulds or extruded and cut into billets to form pre-ceramic articles. Where extrusion is employed, it is preferable to use a pressing aid in the silicon composition. It is also preferable to use an opening agent, in particular when using clay as the binder material, to aid drying.

A wide variety of ceramic compositions can be obtained by baking a pre-ceramic mixture consisting of the silicon composition. The ceramics thus made have been found to possess useful, advantageous properties. They typically have:

(i) good strength, including good thermal (i.e. hot and cold) strength;
(ii) good thermal insulation properties;
(iii) good thermal stability (i.e. have good refractory properties);
(iv) a high resistance to acid; and/or
(v) good porosity/density characteristics, affording a light but strong material.

In particular, the ceramics have been found to possess good thermal insulation and stability properties making them useful in applications which typically employ refractory materials. The properties of the ceramics will of course vary somewhat depending on the nature of the binder material used. For example, clay binder materials have a tendency to produce ceramics which are highly acid resistant and alumina materials have a tendency to produce ceramics which are light and strong. Due to its properties mentioned above, ceramics derived from the silicon composition have particular advantages when used as refractories (materials that withstand high temperature) and insulation bricks. One example of refractory use is as kiln furniture, that is ceramic articles used as a support for other ceramic articles which are being fired. The combination of high strength at firing temperatures and high thermal stability gives ceramics produced according to the invention particular advantages for kiln furniture. Firebricks and other refractories containing more than 25% solids from hydrolysed silicon compounds have increased strength compared to known firebricks. The ceramics derived from the silicon composition also have advantages when used as ceramic filters, ceramic membranes, catalysts, particularly porous catalysts, and ceramic nozzles.

Ceramics prepared from the silicon compositions typically have a density in the range from 0.5 to 1.6 kgdm$^{-3}$. Preferred ceramic compositions of the invention typically comprise 25 to 65% by weight solids derived from hydrolysed silicon compounds, 3–30% by weight binder material solids and 30–70% by weight of the non-binding solid reagent.

The baking (firing) temperature required to convert the pre-ceramic article into the ceramic will vary according to the particular silicon composition in question, and the type of ceramic being made. The baking temperature suitably varies between 1100 and 1900° C. In the case of clay binder materials, a baking temperature of from 1100 to 1600° C., preferably from 1200 to 1500° C. is suitably employed. At temperatures above these, clays tend to melt. In the case of compositions based on metal hydroxide binder materials or containing a high proportion of alumina, a baking temperature of from 1400 to 1900° C., preferably from 1500 to 1800° C. is suitably employed. Ceramic articles made from silicon compositions according to the invention containing 40 wt % or more alumina are generally capable of retaining their shape on prolonged heating at 1450° C., or even at 1600° C. or above.

The present invention will now be further described by way of the following examples.

EXAMPLE 1

45% Silicone gel of water content 45 to 50 wt. %, produced by hydrolysing higher boiling point organochlorosilanes produced in the manufacture of methylchlorosilanes by the direct process in which silicon metal was reacted with methyl chloride, was preground. 10% Al rich clay was added in solid form as binder and was mixed with the Silicone gel to form a homogenous mass. 45% alumina powder was added and the composition was mixed again to a homogenous silicon composition.

The silicon composition was pressed into shape and allowed to dry for 2 days. The resulting dry hard shapes were fired for 8 hours at 1500° C. The fired product, which had density about 1.2 g/cc, withstood application of pressure sufficient to crumble a conventional insulation brick. The fired product was hard enough to cut glass. The fired product withstood heating to 1650° C. without loss of shape. The fired product, 2 cm thick, was heated to 1500° C. and placed in a 1 cm depth of water without cracking, and was also heated to 1500° C. and dropped in an excess of cold water without cracking.

EXAMPLE 2

70% of the Silicone gel of Example 1 was preground and mixed with 5% fumed silica and 25% ball clay and pressed and dried using the procedure of Example 1. The dry hard shapes were fired for 8 hours at 1300° C. The fired product had a specific gravity of about 1.0 and was highly resistant to acid attack—it was held in contact with 30% aqueous $HNO_3$ for more than 3 months, and also in contact with 50% aqueous $H_2SO_4$ for more than 3 months, without visible degradation. The melting temperature of the fired product was about 1470° C.

EXAMPLE 3

Higher boiling point organochlorosilanes produced in the manufacture of methylchlorosilanes by the direct process were filtered to remove solid materials such as silicon metal, copper and iron. The filtered organochlorosilanes were hydrolysed with lime solution to produce a Silicone gel. The Silicone gel was washed with de-ionised water in a centrifuge and was separated form a heavy mineral phase. 20% of the resulting modified Silicone gel was preground and mixed with 35% clay and 45% alumina powder and pressed and dried using the procedure of Example 1. The clay was an alumina rich clay from Fuchs. The alumina ($Al_2O_3$) had the following grain distribution by wt %: 10%>90 μm; 30%>63 μm; 60%>45 μm; 80%>32 μm. The dry hard shapes were fired for 4 hours at 1450° C. The fired product retained its shape at temperatures up to 1670° C. and was suitable as a rack for support of ceramic articles during firing. The fired product also resisted molten aluminium and could be used as a mould for aluminium ingots or castings.

EXAMPLE 4

25% of the modified Silicone gel of Example 3 was preground and mixed with 40% alumina and 35% clay. The alumina and clay used were as described in Example 3. The mixture was pressed and dried using the procedure of Example 1. The dry hard shapes were fired for 4 hours at 1450° C. The fired product had an insulation value of 1.07 W/(mK) when tested according to DIN EN 993-15 at 1100° C. and was particularly suitable as refractory insulation material.

The invention claimed is:

1. A silicon composition comprising 25 to 95 wt % of a silicone gel, the major components of which are hydrolysed disilanes and 3 to 75 wt % of a binder material.

2. A silicon composition according to claim 1, characterised in that the hydrolysed disilane composition is the hydrolysed product of organohalosilanes produced in the manufacture of organosilicon materials or halosilanes.

3. A silicon composition according to claim 2, characterised in that the hydrolysed disilane composition is the gel produced by hydrolysing higher boiling point organohalosilanes produced in the manufacture of organohalosilanes or halosilanes by the direct process in which silicon metal is reacted with an organic halide or hydrogen chloride.

4. A silicon composition according to claim 3, characterised in that the gel is modified by water washing and by removal of solid material from the gel or from the higher boiling point organohalosilanes.

5. A silicon composition according to claim 1, characterised in that the hydrolysed disilane composition is the hydrolysed product of organohalosilanes produced in the manufacture of organosilicon materials or halosilanes.

6. A silicon composition according to claim 5, characterised in that the hydrolysed disilane composition is the gel produced by hydrolysing higher boiling point organohalosilanes produced in the manufacture of organohalosilanes or halosilanes by the direct process in which silicon metal is reacted with an organic halide or hydrogen chloride.

7. A silicon composition according to claim 6, characterised in that the gel is modified by water washing and by removal of solid material from the gel or from the higher boiling point organohalosilanes.

8. A silicon composition according to claim 1, characterised in that the binder material is reactive with the hydrolysed silicon compounds.

9. A silicon composition according to claim 8, in which the binder material is selected from clay and aluminium hydroxide.

10. A method for making a ceramic article which method comprises shaping the silicon composition of claim 1 to form a pre-ceramic article and baking the article at an elevated temperature.

11. A method according to claim 10, characterised in that the article is baked at a temperature in the range 1100 to 1900° C.

12. A method according to claim 11, characterised in that the silicon composition is shaped into kiln furniture.

13. A method according to claim 11, for the production of refractory insulation material.

14. A ceramic article produced by the method of claim 10.

15. A ceramic article according to claim 14 which comprises 25 to 65% by weight solids derived from hydrolysed silicon compounds, 3–30% by weight binder material solids and 30–70% by weight of the non-binding solid reagent.

16. A silicon composition comprising 15 to about 80 wt. % of hydrolysed silicon compounds, 3 to 75 wt % of a binder material and 10 to about 70 wt. % of a solid reagent which is reactive with the hydrolysed silicon compounds but does not act as a binder.

17. A silicon composition according to claim 16, comprising at least 25 wt. % hydrolysed silicon compounds, at least 10 wt. % binder material and at least 20 wt. % of the solid reagent which is reactive with the hydrolysed silicon compounds but does not act as a binder.

18. A silicon composition according to claim 16, characterised in that the hydrolysed silicon compounds comprise hydrolysed disilanes and silmethylenes.

19. A silicon composition according to claim 16, characterised in that the binder material is reactive with the hydrolysed silicon compounds.

20. A silicon composition according to claim 19, in which the binder material is selected from clay and aluminium hydroxide.

21. A silicon composition according to claim 16, characterised in that the solid reagent which is reactive with the hydrolysed silicon compounds but does not act as a binder is a metal oxide.

22. A silicon composition according to claim 21, characterised in that the metal oxide is alumina.

23. A method for making a ceramic article which method comprises shaping the silicon composition of claim 16, to form a pre-ceramic article and baking the article at an elevated temperature.

24. A method according to claim 23, characterised in that the article is baked at a temperature in the range 1100 to 1900° C.

25. A method according to claim 24, characterised in that the article is baked at a temperature in the range 1400 to 1900° C.

26. A method according to claim 25, characterised in that the silicon composition is shaped into kiln furniture.

27. A method according to claim 25, for the production of refractory insulation material.

28. A ceramic article produced by the method of claim 23.

29. A ceramic article according to claim 28, which comprises 25 to 65% by weight solids derived from hydrolysed silicon compounds, 3–30% by weight binder material solids and 30–70% by weight of the non-binding solid reagent.

* * * * *